United States Patent
Veilleux, Jr. et al.

(10) Patent No.: US 10,465,612 B2
(45) Date of Patent: Nov. 5, 2019

(54) AIRCRAFT FLUID CONTROL SYSTEM HAVING A PRESSURE SENSOR

(71) Applicant: Hamilton Sundstrand Corporation, Charlotte, NC (US)

(72) Inventors: Leo J. Veilleux, Jr., Wethersfield, CT (US); Lubomir A. Ribarov, West Hartford, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 30 days.

(21) Appl. No.: 15/477,628

(22) Filed: Apr. 3, 2017

(65) Prior Publication Data

US 2018/0283284 A1    Oct. 4, 2018

(51) Int. Cl.

| | |
|---|---|
| *F02C 9/24* | (2006.01) |
| *G01L 13/02* | (2006.01) |
| *F02D 9/00* | (2006.01) |
| *F02C 9/16* | (2006.01) |
| *G01L 9/00* | (2006.01) |
| *F02C 9/28* | (2006.01) |
| *B64D 13/04* | (2006.01) |

(52) U.S. Cl.
CPC .................. *F02C 9/24* (2013.01); *F02C 9/16* (2013.01); *G01L 9/0089* (2013.01); *G01L 13/02* (2013.01); *B64D 13/04* (2013.01); *F02C 9/28* (2013.01); *F02D 9/00* (2013.01)

(58) Field of Classification Search
CPC ..... F02C 9/24; F02C 9/16; F02C 9/28; B64D 13/04; F02D 9/00
USPC .......................................... 60/39.281, 39.181
See application file for complete search history.

(56) References Cited

U.S. PATENT DOCUMENTS

| | | | | |
|---|---|---|---|---|
| 3,215,057 | A | * 11/1965 | Turek | ..................... A61M 16/12 454/70 |
| 3,302,398 | A | * 2/1967 | Madurski | ................... F02C 9/16 137/826 |
| 3,500,826 | A | 3/1970 | Haire | |
| 3,918,254 | A | * 11/1975 | Wernberg | ................. F02C 9/28 60/39.281 |
| 4,272,368 | A | 6/1981 | Foord et al. | |
| 4,314,621 | A | 2/1982 | Hansen | |

(Continued)

FOREIGN PATENT DOCUMENTS

| | | |
|---|---|---|
| WO | 0201055 A1 | 1/2002 |
| WO | 2009130059 A1 | 10/2009 |

OTHER PUBLICATIONS

European Search Report from the European Patent Office for EP Application No. 18165532.5 dated Aug. 23, 2018, 9 pages.

(Continued)

*Primary Examiner* — Hoang M Nguyen
(74) *Attorney, Agent, or Firm* — Cantor Colburn LLP

(57) ABSTRACT

A pressure sensor for fluid control system for an aircraft includes an enclosure, a piston assembly, and a bellows. The enclosure has a body that extends between a first end and a second end. A first fluid line extends to the first end. The piston assembly has a piston head that is movably disposed within the enclosure and a piston rod that extends from the piston head and through the second end. The bellows is disposed within the body that extends between and is operatively connected to the piston head and the first end.

17 Claims, 1 Drawing Sheet

(56) References Cited

U.S. PATENT DOCUMENTS

| | | | |
|---|---|---|---|
| 4,646,624 A * | 3/1987 | Stearns | G01L 13/02 |
| | | | 73/716 |
| 4,932,205 A | 6/1990 | Alderfer et al. | |
| 5,092,178 A | 3/1992 | Vanderlaan | |
| 5,475,976 A | 12/1995 | Phillips | |
| 5,531,513 A | 7/1996 | Tackett | |
| 5,961,309 A | 10/1999 | Harpole et al. | |
| 6,234,758 B1 | 5/2001 | Pawelski | |
| 6,510,736 B1 * | 1/2003 | Van Ee | B67C 3/04 |
| | | | 73/299 |
| 6,854,269 B2 | 2/2005 | Hale | |
| 7,036,530 B2 | 5/2006 | Chen et al. | |
| 7,325,570 B1 | 2/2008 | Krieger | |
| 7,640,919 B1 | 1/2010 | Smith | |
| 2006/0006108 A1 * | 1/2006 | Arias | H01M 8/04208 |
| | | | 210/232 |
| 2006/0130919 A1 | 6/2006 | Ehmann et al. | |
| 2007/0201989 A1 | 8/2007 | Zhu et al. | |
| 2011/0253346 A1 * | 10/2011 | Bartosz | F28D 15/00 |
| | | | 165/104.31 |
| 2012/0199206 A1 | 8/2012 | Futa et al. | |
| 2012/0234770 A1 | 9/2012 | Goodwin | |
| 2014/0294601 A1 | 10/2014 | O'Shea et al. | |
| 2016/0237915 A1 | 8/2016 | Villanueva et al. | |

OTHER PUBLICATIONS

Figliola, R. S., Beasley, D. E., Theory and Design for Mechanical Measurements, 1995, pp. 418-422, 2nd Ed., John Wiley & Sons, Inc., New York.

* cited by examiner

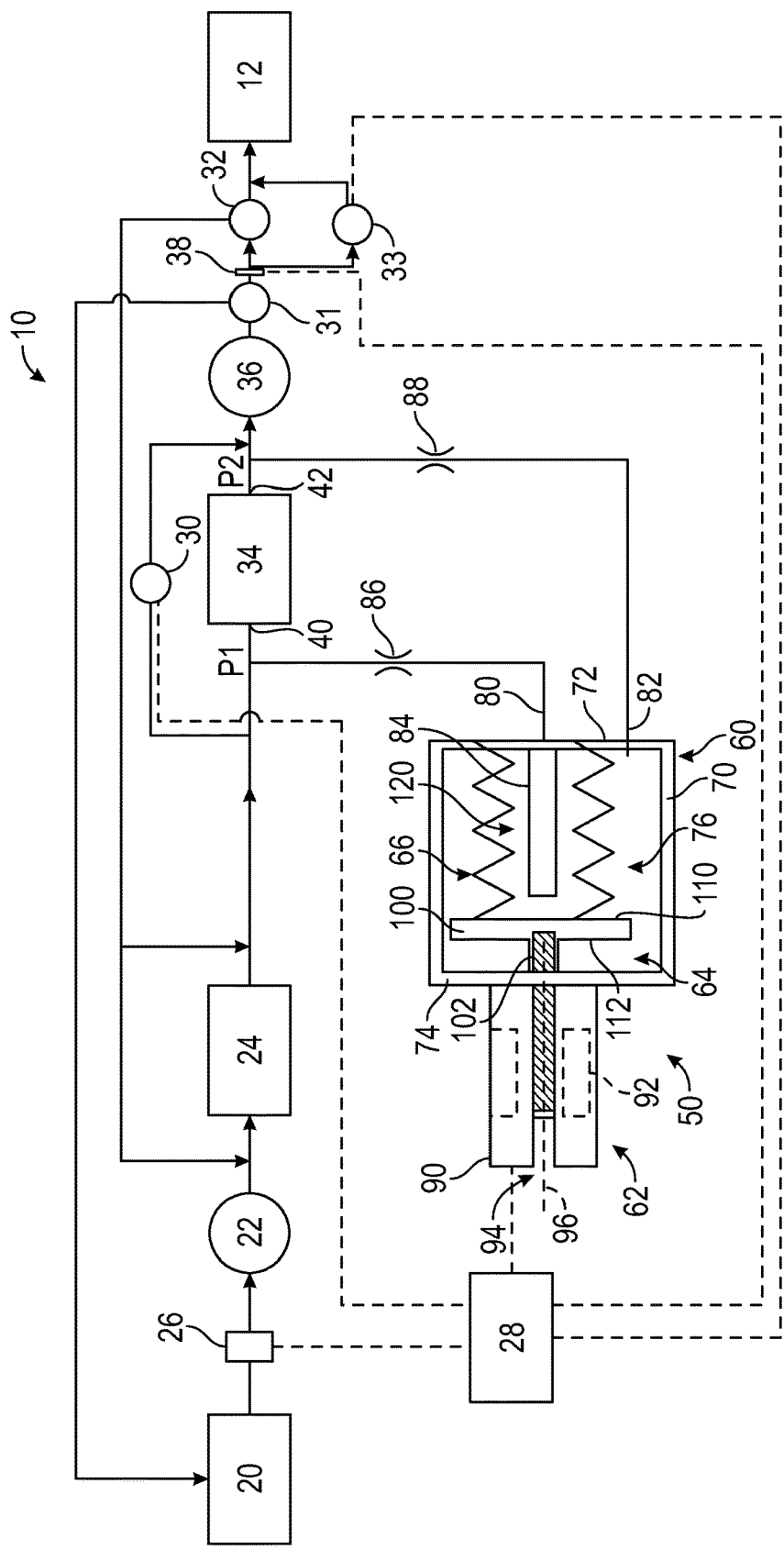

AIRCRAFT FLUID CONTROL SYSTEM HAVING A PRESSURE SENSOR

BACKGROUND

An aircraft may be provided with a fluid control system that delivers a pressurized or conditioned fluid to an aircraft system. The fluid control system and its components may be protected by a filtration system to screen out contaminants or foreign objects that may be within the fluid. As the filtration system collects the contaminants or foreign objects, a pressure drop across the filtration system may increase.

Accordingly, it is desirable to provide a system capable of measuring the pressure drop across the filtration system that is also robust and capable of surviving the operating environment of the fluid control system.

BRIEF DESCRIPTION

According to an embodiment of the present disclosure, a fluid control system for an aircraft is provided. The fluid control system includes a filter module, and a pressure sensor. The filter module has an inlet arranged to receive a fluid and an outlet arranged to provide the fluid to a component. The pressure sensor is connected across the filter module. The pressure sensor includes an enclosure, a piston head, a piston rod, and a bellows. The enclosure receives a first fluid line that is in fluid communication with the inlet and receives a second fluid line that is in fluid communication with the outlet. The piston head is movably disposed within the enclosure. The piston rod extends from the piston head and through the enclosure. The piston rod extends into a coil assembly. The bellows is operatively connected to the piston head and the enclosure and is at least partially disposed about a portion of the first fluid line.

According to another embodiment of the present disclosure, a pressure sensor for fluid control system for an aircraft is provided. The pressure sensor includes an enclosure, a piston assembly, and a bellows. The enclosure has a body that extends between a first end and a second end. A first fluid line extends to the first end. The piston assembly has a piston head that is movably disposed within the enclosure and a piston rod that extends from the piston head and through the second end. The bellows is disposed within the body that extends between and is operatively connected to the piston head and the first end.

According to yet another embodiment of the present disclosure, a pressure sensor is provided. The pressure sensor includes an enclosure, a piston head, a piston rod, a bellows, and a coil assembly. The enclosure has a body that extends between a first end and a second end. The first end receives a first fluid line and the second end receives a second fluid line, wherein the body defines a fluid chamber. The piston head is movably disposed within the fluid chamber. The piston rod extends from the piston head and through the second end. The bellows is disposed within the fluid chamber and extends between the piston head and the first end. The bellows defines a bellows chamber. The coil assembly is disposed at the second end and at least partially receives the piston rod.

BRIEF DESCRIPTION OF THE DRAWINGS

The following descriptions should not be considered limiting in any way. With reference to the accompanying drawings, like elements are numbered alike:

FIG. 1 is an illustrative schematic of a fluid control system having a pressure sensor.

DETAILED DESCRIPTION

A detailed description of one or more embodiments of the disclosed apparatus is presented herein by way of illustration and not limitation with reference to the Figures.

Referring to FIG. 1, a fluid control system 10 is shown. The fluid control system 10 may be capable of providing a fluid such as fuel, hydraulic fluid, oil, or the like to a subsystem or a component 12 of an aircraft, such as a gas turbine engine.

The fluid control system 10 includes a fluid tank or reservoir 20 that is capable of storing the fluid to be provided to the component 12. A first pump 22, such as a low pressure pump, is arranged to provide pressurized fluid from the reservoir 20 to a heat exchanger 24. The heat exchanger 24 is arranged to cool or heat the pressurized fluid that is provided by the first pump 22. A fluid sensor assembly 26 is arranged to detect a fluid pressure in the fluid control system 10.

The fluid sensor assembly 26 includes a fluid pressure sensor. The fluid sensor assembly 26 is in communication with a controller 28. The controller 28 is also in communication with a first bypass valve 30 and a pressure regulating valve 32. The controller 28 may control the position of the pressure regulating valve 32 and another bypass valve 31 (e.g. return to tank valve) based on information provided by the fluid sensor assembly 26. A metering valve 33 is disposed about the pressure regulating valve 32.

Fluid exiting the heat exchanger 24 may flow directly through to the filter module 34 unless the first bypass valve 30 directs some or all of the fluid around the filter module 34 based on a signal indicative of a delta pressure across the filter module 34 being greater than a threshold delta pressure across the filter module 34. Fluid that either bypasses or flows through the filter module 34 flows to a second pump 36. The second pump 36 may be a high pressure pump that delivers or supplies the fluid at a higher pressure than the pressure that the low pressure pump delivers or supplies the fluid. Another fluid sensor assembly 38 is arranged to detect fluid temperature in the fluid control system 10. The another fluid sensor assembly 38 is in communication with the controller 28.

Fluid exiting the second pump 36 may flow to the component 12 unless the pressure regulating valve 32 directs some or all of the flow back to the inlet or the outlet of the heat exchanger 24. At least a portion of the fluid exiting the second pump 36 may be returned to the fluid tank/reservoir 20 by the another bypass valve 31 via a return line.

The filter module 34 receives the fluid through an inlet 40; passes the fluid through a filter element; and delivers the fluid to an outlet 42. The inlet 40 receives the fluid at an inlet pressure or first pressure, P1. The outlet 42 provides the fluid at an outlet pressure or second pressure, P2. The filter element acts as a barrier to collect any contaminants that may be present within the fluid or may be entrained by the fluid. As the filter element of the filter module 34 collects contaminants during operation of the fluid control system 10, a pressure drop across the filter element may increase. In at least one embodiment, should the pressure drop across the filter element increase above a threshold, the first bypass valve 30 may be moved from the closed position towards the open position to enable the fluid to bypass the filter module 34. For example, when the first bypass valve 30 is in the closed position, fluid may flow to the filter module 34 and when the first bypass valve 30 is in the open position, fluid may bypass the filter module 34.

The pressure drop of the filter module 34 is monitored by a pressure sensor 50 that is connected across the filter module 34. The pressure sensor 50 provides a signal indicative of the condition of the filter module 34 or a pressure drop across the filter module 34 to the controller 28.

The pumps of the fluid control system 10, e.g. the first pump 22, the second pump 36, and other pumps that may be present, may create a pressure ripple within the fluid control system 10. The pressure ripple is the result of pressure oscillations generated by the periodic meshing or un-meshing of the teeth of the gears within a gear pump. For example, an operating external gear pump may expose the fluid control system to these pressure oscillations both on the inlet and outlet sides of the external gear pump. These pressure oscillations are typically related to the pumps shaft rotational speed and vary the forced oscillation frequency within the fluid control system 10. The pressure ripple may also exist with centrifugal and positive displacement pumps.

The pressure sensor 50 is arranged to measure the pressure drop across the filter module 34 while being robust against the pressure ripple or pressure oscillations due to the pumps. The pressure sensor 50 monitors or measures the first pressure, P1, at the inlet 40 of the filter module 34 and monitors or measures the second pressure, P2, at the outlet 42 of the filter module 34. The pressure sensor 50 provides a signal indicative of the first pressure, P1, and the second pressure, P2, to the controller 28. The controller 28 detects a pressure drop across the filter module 34 based on the first pressure, P1, and the second pressure, P2, as provided by the pressure sensor 50. In at least one embodiment, the pressure sensor 50 provides a signal indicative of the pressure drop across the filter module 34 based on the first pressure, P1, and the second pressure, P2, to the controller 28.

The controller 28 outputs for display an indicator indicative of the pressure drop across the filter module 34. In at least one embodiment, should the pressure drop across the filter module 34 be greater than a threshold, the controller 28 outputs for display a warning to an operator of the aircraft or maintenance worker.

The pressure sensor 50 includes an enclosure 60, a coil assembly 62, a piston assembly 64, and a bellows 66.

The enclosure 60 includes a body 70 that extends between a first end 72 and a second end 74. The body 70 is configured as a hollow body having an interior. The interior of the body 70 of the enclosure 60 defines a fluid chamber 76 having a fluid chamber volume.

The first end 72 is disposed opposite the second end 74. The first end 72 receives a first fluid line 80 and a second fluid line 82. The first fluid line 80 is in fluid communication with the inlet 40 of the filter module 34 and the interior of the body 70. The first fluid line 80 includes a port line 84 that extends into the interior of the body 70. The second fluid line 82 is spaced apart from the first fluid line 80. The second fluid line 82 is in fluid communication with the outlet 42 of the filter module 34 and the fluid chamber 76. In at least one embodiment, the second fluid line 82 also includes a port line that extends into the interior of the body 70. In at least one embodiment, the second fluid line 82 is received by the body 70 or is received by the second end 74. A first orifice 86 is included in the first fluid line 80 upstream of the port line 84. A second orifice 88 is included in the second fluid line upstream of the fluid chamber 76. The first orifice 86 and the second orifice 88 act to dampen any unwanted fluid oscillations upstream of the port line 84 and the fluid chamber 76, respectively. The first fluid line 80 and the second fluid line 82 are each segregated from the filter module 34 by the first orifice 86 and the second orifice 88, respectively.

The coil assembly 62 is disposed on the second end 74 of the body 70 of the enclosure 60. The coil assembly 62 includes a housing 90 and a coil 92 disposed within the housing 90. The housing 90 is operatively connected to the second and 74 of the body 70 of the enclosure 60. The housing 90 defines an opening 94 that extends through the housing 90 along an axis 96. The coil 92 is disposed within the housing 90 and is disposed about and spaced apart from the opening 94.

The piston assembly 64 is at least partially disposed within the interior of the body 70 of the enclosure 60. The piston assembly 64 includes a piston head 100 and a piston rod 102.

The piston head 100 is movably disposed within the fluid chamber 76 of the interior of the body 70 of the enclosure 60. In at least one embodiment, the piston head 100 slidably engages an interior surface of the body 70 of the enclosure 60. The piston head 100 includes a first face 110 and a second face 112. The first face 110 faces towards the first end 72 of the body 70 of the enclosure 60. The second face 112 is disposed opposite the first face 110 and faces towards the second end 74 of the body 70 of the enclosure 60.

The piston rod 102 is operatively connected to the piston head 100. The piston rod 102 extends from the second face 112 of the piston head 100 through the second end 74 of the body 70 of the enclosure 60. The piston rod 102 extends at least partially into the coil assembly 62 along the axis 96. The piston rod 102 is configured as a core. As the piston head 100 moves relative to at least one of the first end 72 and the second and 74, the piston rod moves relative to the coil assembly 62.

The bellows 66 is disposed within the fluid chamber 76 of the interior of the body 70 of the enclosure 60. The bellows 66 extends between and is operatively connected to the piston head 100 and the first end 72 of the body 70 of the enclosure 60.

The bellows 66 is at least partially disposed about a portion of the first fluid line 80 such that an interior of the bellows 66 is in fluid communication with the first fluid line 80. The first face 110 of the piston head 100, the first end 72 of the body 70 of the enclosure 60, and an interior of the bellows 66 defines a bellows chamber 120. The bellows chamber 120 is disposed within the fluid chamber 76. The bellows chamber 120 has a bellows chamber volume. The fluid chamber volume is different than the bellows chamber volume. In at least one embodiment, the fluid chamber volume is greater than the bellows chamber volume.

The port line 84 of the first fluid line 80 extends into the bellows chamber 120 such that the first fluid line 80 is in fluid communication with the bellows chamber 120.

The coil assembly 62 and the piston assembly 64 function as a linear variable differential transformer (LVDT). The first pressure, P1, inside the bellows chamber 120 of the bellows 66 and the second pressure, P2, inside the fluid chamber 76 outside of the bellows 66 enables a smooth resonance free/noise free measurement of the differential pressure across the filter module 34. Should there be a pressure difference between the first pressure, P1, and the second pressure, P2, the piston rod 102 moves relative to the coil assembly 62. The coil assembly 62 provides a signal indicative of displacement of the piston rod 102 relative to the coil assembly 62 to the controller 28. The signal indicative of displacement of the piston rod 102 relative to the coil assembly 62 is interpreted by the controller 28 as the differential pressure across the filter module 34. The bellows 66 in conjunction with the piston assembly 64 enables the signal provided by the pressure sensor 50 to be less susceptible to pressure ripples or pressure oscillations caused by the pumps that pressurize the fluid in the fluid control system 10.

The size of the bellows 66 and the material of the bellows 66 may be sized and selected based on the desired response rate of the attached LVDT.

The pressure sensor 50 is a "true" delta-pressure sensor that measures or monitors a delta-pressure (i.e. differential pressure) across the filter module 34. The delta-pressure is detected by the bellows 66 and the piston head 100. The large internal volume of the bellows 66 acts to dampen any unwanted pressure ripple effects/signals in the fluid system to reduce signal errors or the effects of noise. Conventional methods for detection of differential pressure across a fluid filter commonly rely on two separate filter-dedicated pressure sensors (one pressure sensor disposed upstream of a fluid filter and another pressure sensor disposed downstream of the fluid filter) to provide pressure measurement signals which are then subtracted to detect the delta-pressure across the fluid filter. The pressure sensor 50 avoids the pressure signal subtraction process (in the conventional method for detection of differential pressure) that may lead to subtraction error due to noise in the system, low-reliability of the individual filter-dedicated pressure sensors, damage to the pressure sensors, etc. Long sense lines connecting the individual pressure sensors (in the conventional method for detection of differential pressure) to the pressure detection system may act to create unwanted signal noise and, hence, result in further detection errors.

The pressure sensor 50 allows direct measurement of the differential pressure across the filter module 34. The pressure sensor 50, having the bellows 66 with a bellows volume, minimizes (or even eliminates) pressure signal distortion due to pressure ripples or pressure oscillations due to the pump operation. The bellows volume of the bellows 66 may act as a pressure oscillation "settling chamber." The pressure sensor 50 also allows trending of filter element blockage as a result of the accumulation of contaminants within the filter element of the filter module 34. The filter element blockage trending data may provide certain level of predictability thus supporting preventive maintenance and repair/replacement as part of a comprehensive Prognostics and Health Management (PHM) component life cycle program. Furthermore, the filter blockage trending data may be latched upon in response to aircraft landing, to prompt attention from ground maintenance service crews prior to a subsequent aircraft flight.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A fluid control system for an aircraft, comprising:
   a filter module having an inlet arranged to receive a fluid and an outlet arranged to provide the fluid to a component; and
   a pressure sensor connected across the filter module, the pressure sensor including:
   an enclosure that receives a first fluid line that is in fluid communication with the inlet and receives a second fluid line that is in fluid communication with the outlet,
   a piston head movably disposed within the enclosure,
   a piston rod extending from the piston head and through the enclosure, the piston rod extending into a coil assembly,
   a bellows operatively connected to the piston head and the enclosure and is at least partially disposed about a portion of the first fluid line, and
   wherein the coil assembly slidably receives the piston rod.

2. The fluid control system of claim 1, wherein an interior of the enclosure defines a fluid chamber.

3. The fluid control system of claim 2, wherein the piston head and the bellows define a bellows chamber disposed within the fluid chamber.

4. The fluid control system of claim 3, wherein the first fluid line is in fluid communication with the bellows chamber.

5. The fluid control system of claim 4, wherein the second fluid line is in fluid communication with the fluid chamber.

6. The fluid control system of claim 5, wherein a fluid chamber volume is greater than a bellows chamber volume.

7. The fluid control system of claim 6, wherein at least one of the first fluid line and the second fluid line is segregated from the filter module by an orifice.

8. A pressure sensor for an aircraft fluid control system, comprising:
   an enclosure having a body that extends between a first end and an opposite second end, the first end receives a first fluid line;
   a piston assembly having a piston head movably disposed within the enclosure and a piston rod extending from the piston head and through the second end; and
   a bellows disposed within the body that extends between and is operatively connected to the piston head and the first end,
   wherein the first fluid line includes a port line that extends into a bellows chamber,
   wherein the first end and the body defines an inlet for a second fluid line,
   wherein the first fluid line is in fluid communication with the bellows chamber and the second fluid line is in fluid communication with a fluid chamber, and a coil assembly, wherein the coil assembly slidably receives the piston rod.

9. The pressure sensor of claim 8, wherein an interior of the body of the enclosure defines the fluid chamber.

10. The pressure sensor of claim 9, wherein the piston head, the first end, and the bellows define the bellows chamber.

11. The pressure sensor of claim 10, wherein the bellows chamber is disposed within the fluid chamber.

12. A pressure sensor, comprising:
 an enclosure having a body that extends between a first end and a second end, the first end receives a first fluid line and a second fluid line, wherein the body defines a fluid chamber;
 a piston head movably disposed within the fluid chamber;
 a piston rod extending from the piston head and through the second end;
 a bellows disposed within the fluid chamber and extending between the piston head and the first end, wherein the bellows defines a bellows chamber; and
 a coil assembly disposed at the second end and at least partially receives the piston rod,
 wherein the first fluid line includes a port line that extends into the bellows chamber,
 wherein the first end defines an inlet for the second fluid line, and
 wherein the first fluid line is in fluid communication with the bellows chamber and the second fluid line is in fluid communication with the fluid chamber.

13. The pressure sensor of claim 12, wherein the bellows chamber is disposed within the fluid chamber.

14. The pressure sensor of claim 13, wherein a volume of the fluid chamber is greater than a volume of the second bellows chamber.

15. The pressure sensor of claim 14, wherein the bellows chamber is in fluid communication with the first fluid line and the fluid chamber is in fluid communication with the second fluid line.

16. The fluid system control system of claim 1, wherein the filter module comprises a filter element arranged such that fluid received through the inlet passes through the filter element and is delivered to the outlet, the fluid control system further comprising:
 a fuel flow provided at the inlet at the inlet of the filter module; and
 wherein the component comprises a gas turbine engine connected to the outlet of the filter module, wherein fuel occupies the fluid chamber, and wherein fuel occupies the bellows chamber.

17. The fluid control system of claim 1, further comprising:
 a first orifice included in the first fluid line; and
 a second orifice included in the second fluid line, wherein the first orifice and the second orifice are selected to dampen oscillations in a flow of fuel provided to the inlet of the filter module.

* * * * *